United States Patent
Unno

(10) Patent No.: US 10,848,060 B1
(45) Date of Patent: Nov. 24, 2020

(54) SWITCHING POWER CONVERTER WITH FAST LOAD TRANSIENT RESPONSE

(71) Applicant: Dialog Semiconductor (UK) Limited, London (GB)

(72) Inventor: Naoyuki Unno, Kawasaki (JP)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/370,552

(22) Filed: Mar. 29, 2019

(51) Int. Cl.
*H02M 3/156* (2006.01)
*H02M 1/00* (2006.01)

(52) U.S. Cl.
CPC .... *H02M 3/156* (2013.01); *H02M 2001/0009* (2013.01); *H02M 2003/1566* (2013.01)

(58) Field of Classification Search
CPC ......... H02M 3/156; H02M 2003/1566; H02M 3/158; H02M 3/1588
See application file for complete search history.

(56) References Cited

U.S. PATENT DOCUMENTS

| | | | | |
|---|---|---|---|---|
| 7,812,578 B2 * | 10/2010 | Sugahara | ............ | H02M 3/158 323/224 |
| 7,982,445 B1 * | 7/2011 | Xin-LeBlanc | ........ | H02M 3/158 323/282 |
| 9,191,013 B1 * | 11/2015 | Kim | ......................... | H03L 5/02 |
| 9,257,905 B1 * | 2/2016 | Kotikalapoodi | ...... | H02M 3/158 323/284 |
| 9,755,519 B1 * | 9/2017 | Huang | .................. | H02M 3/156 361/111 |
| 9,806,617 B1 * | 10/2017 | Ozawa | ................. | H02M 3/158 |
| 2002/0015319 A1 * | 2/2002 | Hartular | ............. | H02M 3/1584 363/56.05 |

(Continued)

FOREIGN PATENT DOCUMENTS

DE    10 2016 222 177    3/2018

OTHER PUBLICATIONS

"A Three-Level Single-Inductor Triple-Output Converter with an Adjustable Flying Capacitor Technique for Low Output Ripple and Fast Transient Response," by Li-Cheng Chu et al., 2017, IEEE International Solid State Circuits Conference (ISSCC), Feb. 5-9, 2017, pp. 186-188.

(Continued)

*Primary Examiner* — Fred E Finch, III
(74) *Attorney, Agent, or Firm* — Saile Ackerman LLC; Stephen B. Ackerman

(57) ABSTRACT

A switched power converter and a method are presented. The converter has a main stage with a main converter that exhibits an inductor and at least one switch to control an inductor current through the inductor. Furthermore, the switched power converter has an auxiliary stage to determine a sensed current indicative of the inductor current, and to provide or sink an auxiliary current to or from the output node, wherein the auxiliary current depends on the sensed current. In addition, the switched power converter has control circuitry to determine whether the output voltage falls below an undershoot threshold or exceeds an overshoot threshold, and to activate the auxiliary stage to provide or sink the auxiliary current, if it is determined that the output voltage falls below the undershoot threshold or exceeds the overshoot threshold.

14 Claims, 8 Drawing Sheets

(56) References Cited

U.S. PATENT DOCUMENTS

| | | | |
|---|---|---|---|
| 2009/0237854 A1* | 9/2009 | Mok | H02M 3/156 361/111 |
| 2010/0250993 A1 | 9/2010 | Drogi et al. | |
| 2013/0093404 A1* | 4/2013 | Park | H02M 1/32 323/273 |
| 2013/0214858 A1* | 8/2013 | Tournatory | H02M 3/156 330/127 |
| 2013/0241289 A1* | 9/2013 | Ogawa | H02J 1/00 307/52 |
| 2013/0321076 A1* | 12/2013 | Galbis | H03F 1/0216 330/127 |
| 2014/0021930 A1* | 1/2014 | Liu | H02M 3/1584 323/271 |
| 2014/0333277 A1* | 11/2014 | Ngo | H02M 3/158 323/284 |
| 2015/0160669 A1* | 6/2015 | Marschalkowski | G05F 1/59 323/273 |
| 2015/0227146 A1* | 8/2015 | Knoedgen | G05F 1/575 323/280 |
| 2016/0126841 A1* | 5/2016 | Sandrez | H03F 1/0216 330/127 |
| 2016/0365789 A1* | 12/2016 | Ejury | H02M 3/156 330/127 |
| 2017/0222556 A1* | 8/2017 | Lin | H02M 1/32 323/273 |
| 2017/0264190 A1* | 9/2017 | Unno | H03L 5/02 |
| 2018/0083526 A1* | 3/2018 | Lin | H02M 3/158 |
| 2018/0083533 A1* | 3/2018 | Price | H02M 3/158 323/224 |

OTHER PUBLICATIONS

"A 30MHz Hybrid Buck Converter with 36mV Droop and 125ns 1% Settling Time for a 1.25A/2ns Load Transient," by Lin Cheng et al., 2017 IEEE International Solid-State Circuits Conference (ISSCC), Feb. 5-9, 2017, pp. 188-190.

* cited by examiner

SWITCHING POWER CONVERTER WITH FAST LOAD TRANSIENT RESPONSE

TECHNICAL FIELD

The present document relates to switching power converters, notably to step-up switching DC-DC power converters. In particular, the present document relates to providing a switching converter exhibiting a fast load transient response.

BACKGROUND

There is a growing demand for providing switching DC-DC converters with relatively fast load transient response. There are various different techniques for reducing the load transient response time of buck or step-down converters. However, these techniques are typically not applicable to boost or step-up converters, due to the fact that step-up converters cannot provide current during the boost on-time, i.e. during the time interval when the low side switch of the step-up converter is turned on.

SUMMARY

The present document addresses the technical problem of reducing the load transient response time of switching converters, notably of step-up or boost switching converter. The technical problem is solved by the independent claims. Preferred examples are described in the dependent claims. According to an aspect, a switched power converter is described which comprises a main stage with a main converter that exhibits an inductor and at least one switch configured to control an inductor current through the inductor. Furthermore, the switched power converter comprises an auxiliary stage which is configured to determine a sensed current indicative of the inductor current, and to provide or sink an auxiliary current to or from the output node of the switched power converter, wherein the auxiliary current depends on and/or is proportional to the sensed current.

Furthermore, the switched power converter comprises control circuitry which is configured to determine whether the output voltage falls below an undershoot threshold or exceeds an overshoot threshold. In addition, the control circuitry is configured to activate the auxiliary stage to provide or sink the auxiliary current, if it is determined that the output voltage falls below the undershoot threshold or exceeds the overshoot threshold. Furthermore, the auxiliary stage may be deactivated (to stop the provision or the sinking of the auxiliary current), if it is determined that the output voltage lies above the undershoot threshold and/or below the overshoot threshold.

According to a further aspect, a method for operating a switched (DC-DC) power converter is described. The switched power converter comprises a main stage with a main converter that exhibits an inductor and at least one switch configured to control an inductor current through the inductor. Furthermore, the switched power converter comprises an auxiliary stage which is configured to determine a sensed current indicative of the inductor current, and to provide or sink an auxiliary current to or from the output node, wherein the auxiliary current depends on the sensed current.

The method comprises determining whether the output voltage falls below an undershoot threshold or exceeds an overshoot threshold. In addition, the method comprises activating the auxiliary stage to provide or sink the auxiliary current, if it is determined that the output voltage falls below the undershoot threshold or exceeds the overshoot threshold. Furthermore, the method may comprise deactivating the auxiliary stage (to stop the provision or the sinking of the auxiliary current), if it is determined that the output voltage lies above the undershoot threshold and/or below the overshoot threshold.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
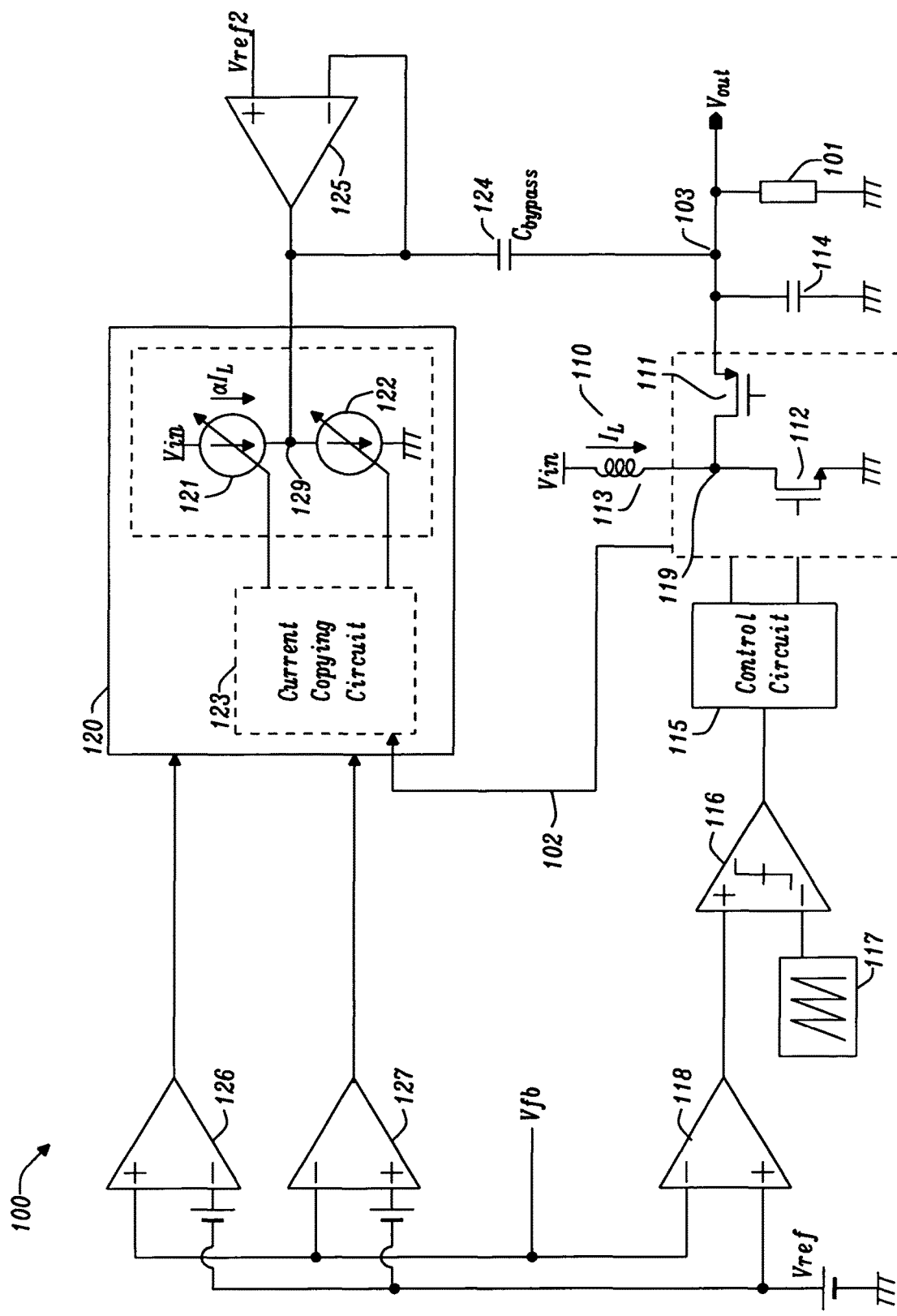
FIG. 1 illustrates an example switching converter with an auxiliary phase or auxiliary stage for load transients.

As outlined above, the present document addresses the technical problem of providing a (step-up) switching converter which exhibits an improved (i.e. accelerated) load transient response. In this context, FIG. 1 shows a switching power converter 100 which comprises as a main phase or main stage 110 a step-up, notably a boost converter. The step-up converter comprises an inductor 113 which is (directly) coupled to the input voltage Vin and/or the input node of the power converter 100 and which is (directly) coupled to an intermediate node 119 (also referred to as the LX node). The step-up converter further comprises a low side switch 112 (also referred to as the pass device) which is coupled to the intermediate node 119 and to a reference potential (notably ground). In addition, the step-up converter comprises a high side switch 111 configured to couple the intermediate node 119 with the output node 103 of the power converter 100 to provide a main current at the output voltage Vout. The output node 103 is coupled to a load 101. Furthermore, the output node 103 typically exhibits an output capacitor 114.

The main phase 110 comprises a regulation loop for regulating the output voltage Vout in accordance to a main reference voltage Vref. The regulation loop comprises an error amplifier 118 configured to compare an indication Vfb of the output voltage Vout with the main reference voltage Vref, to provide an error voltage. The error voltage is compared with a saw tooth signal 117 in a comparator 116, thereby providing a PWM signal which is indicative of the duty cycle of the low side switch 112 within a switching period of the main converter. A control circuit 115 is configured to control the switches 111, 112 in dependence of the PWM signal provided by the comparator 116. In particular, the switches 111, 112 may be turned on and off in an alternating manner during a sequence of switching periods. Each switching period may comprise a time interval during which the low side switch 112 is turned off and the high side switch 111 is turned on, and another time interval during which the low side switch 112 is turned on and the high side switch 111 is turned off.

The step-up converter of the main phase 110 may be such that no output current is provided at the output node 103 within the time intervals during which the low side switch 112 is switched on and the high side switch 111 is switched off. In particular, each period comprises a time interval, during which no output current is provided at the output node. As a result of this, a step-up converter typically exhibits a relatively slow response to a load transient, notably to an increase of the load current requested by the load 101 at the output node 103 of the power converter 100.

The power converter 100 of FIG. 1 comprises an additional auxiliary phase or auxiliary stage 120 which is configured to provide an auxiliary current at the output node 103 of the power converter 100. The auxiliary phase 120 may be activated if an undershoot or an overshoot of the output voltage Vout is detected. An overshoot comparator 126 may be provided, which is configured to compare the indication Vfb of the output voltage Vout with an overshoot threshold (which may be equal to the main reference voltage Vref plus a (positive) offset). Furthermore, an undershoot comparator 127 may be provided, which is configured to compare the indication Vfb of the output voltage Vout with an undershoot threshold (which may be equal to the main reference voltage Vref minus a (positive) offset).

If an overshoot or an undershoot of the output voltage Vout is detected, the auxiliary phase 120 may be used to provide or to draw an auxiliary current to or from the output node 103, notably during time intervals at which the high side switch 111 is turned off. For this purpose, the auxiliary phase 120 may comprise a current sensing circuit configured to sense the inductor current through the inductor 113 of the main phase 110, and to provide a sensed current 102 which is indicative of the inductor current. Furthermore, the auxiliary phase 120 comprises a current copying circuit 123 configured to control a current source 121, 122 to provide the auxiliary current. The auxiliary current may be provided to or drawn from the output node 103 via a bypass capacitor 124.

In case of a voltage overshoot, the low side current source 122 may be used to draw an auxiliary current from the output node 103 towards the reference potential (notably towards ground). On the other hand, in case a voltage undershoot is detected, the high side current source 121 may be used to provide an additional auxiliary current to the output node 103. The auxiliary current may be drawn or provided during time intervals at which the high side switch 111 is turned off.

Furthermore, the auxiliary phase 120 may comprise a regulation circuit or buffer 125 configured to set the voltage at the auxiliary output node 129 between the high side current source 121 and the load side current source 122 in accordance to an auxiliary reference voltage Vref2. The auxiliary reference voltage Vref2 may be Vin/2. As a result of this, the auxiliary current may be provided in a reliable manner.

Hence, FIG. 1 illustrates a power converter 100 which comprises two output stages, a main stage/phase 110 and an auxiliary stage/phase 120. When a load transient occurs and the output voltage Vout decreases, the main phase 110 is controlled by PWM (pulse width modulation) control or PFM (pulse frequency modulation) control to increase the output current at the output node 103. If the output current is not sufficient and (as a result of this) the output voltage Vout is lower than the comparator threshold for a voltage undershoot, the auxiliary phase 120 is enabled or activated to provide an auxiliary current to the output node 103, notably during boost on-time (when the low side switch 112 is turned on). The auxiliary current may be set by copying the (sensed) main phase inductor current. When the low side switch 112 of the main phase 110 (e.g. an NMOS FET transistor) is turned on to increase the inductor current, the high side current source 121 (e.g. a PMOS FET transistor) of the auxiliary phase 120 provides an auxiliary current to the output node 103 via the bypass capacitor $C_{bypass}$ 124. Once the output voltage Vout recovers and is near the target or main reference voltage, the current source 121 of the auxiliary phase 120 may be disabled. The threshold for activating the auxiliary phase 120 may be different from the threshold for deactivating the auxiliary phase 120, in order to avoid a toggling between activation and deactivation of the auxiliary phase 120.

When the power converter 100 is in a steady state and the auxiliary phase 120 is disabled, the output voltage of the auxiliary phase 120 (at the auxiliary output node 129) may be regulated to the auxiliary reference voltage Vref2 using a buffer 125. Vref2 may be Vin/2.

If the output voltage Vout increases above a comparator threshold for a voltage overshoot, the auxiliary phase 120 may be enabled to subtract a copy of the main phase inductor current from the output current. Once the output voltage Vout recovers and is near the target voltage or main reference voltage, the auxiliary phase 120 is disabled.

Figure 2A:
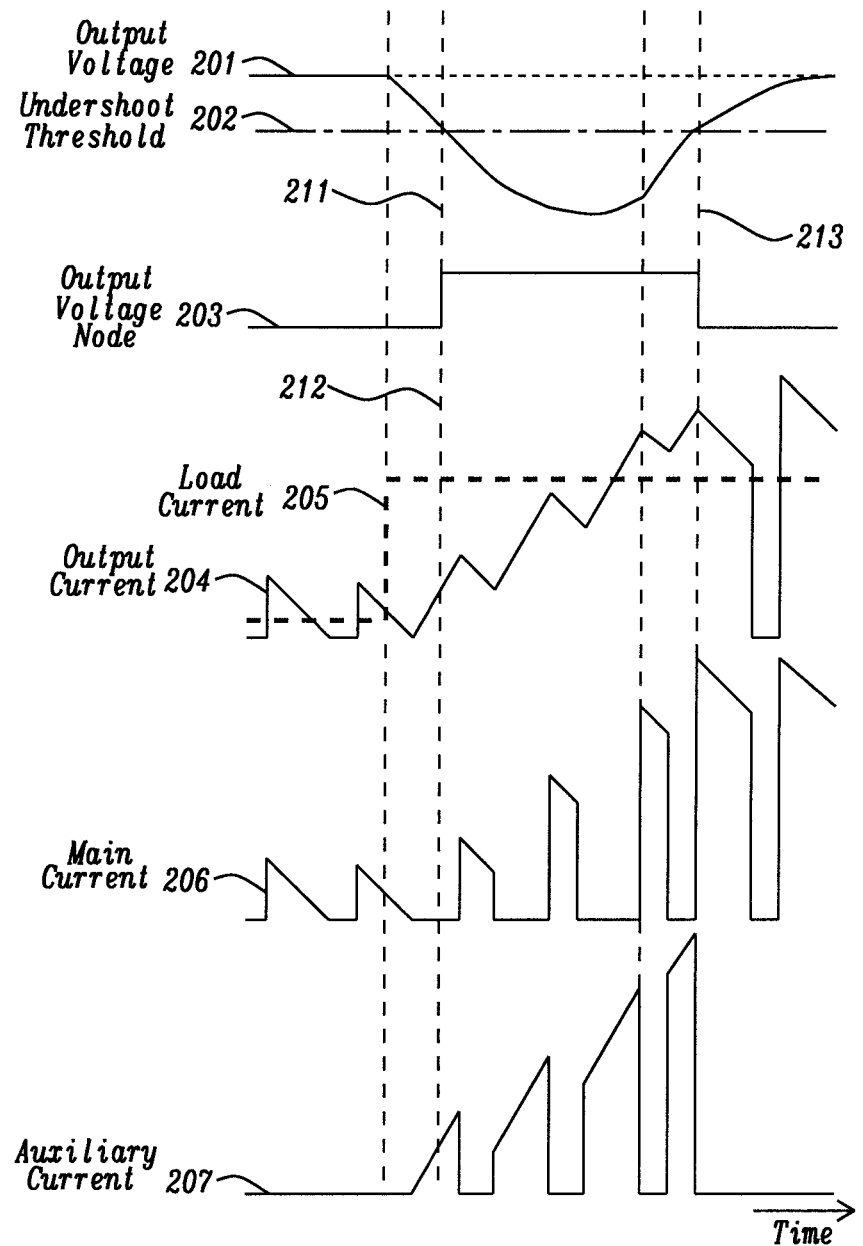
FIG. 2A shows example measurement signals of the switching converter of FIG. 1 when using PWM control.
Figure 2B:
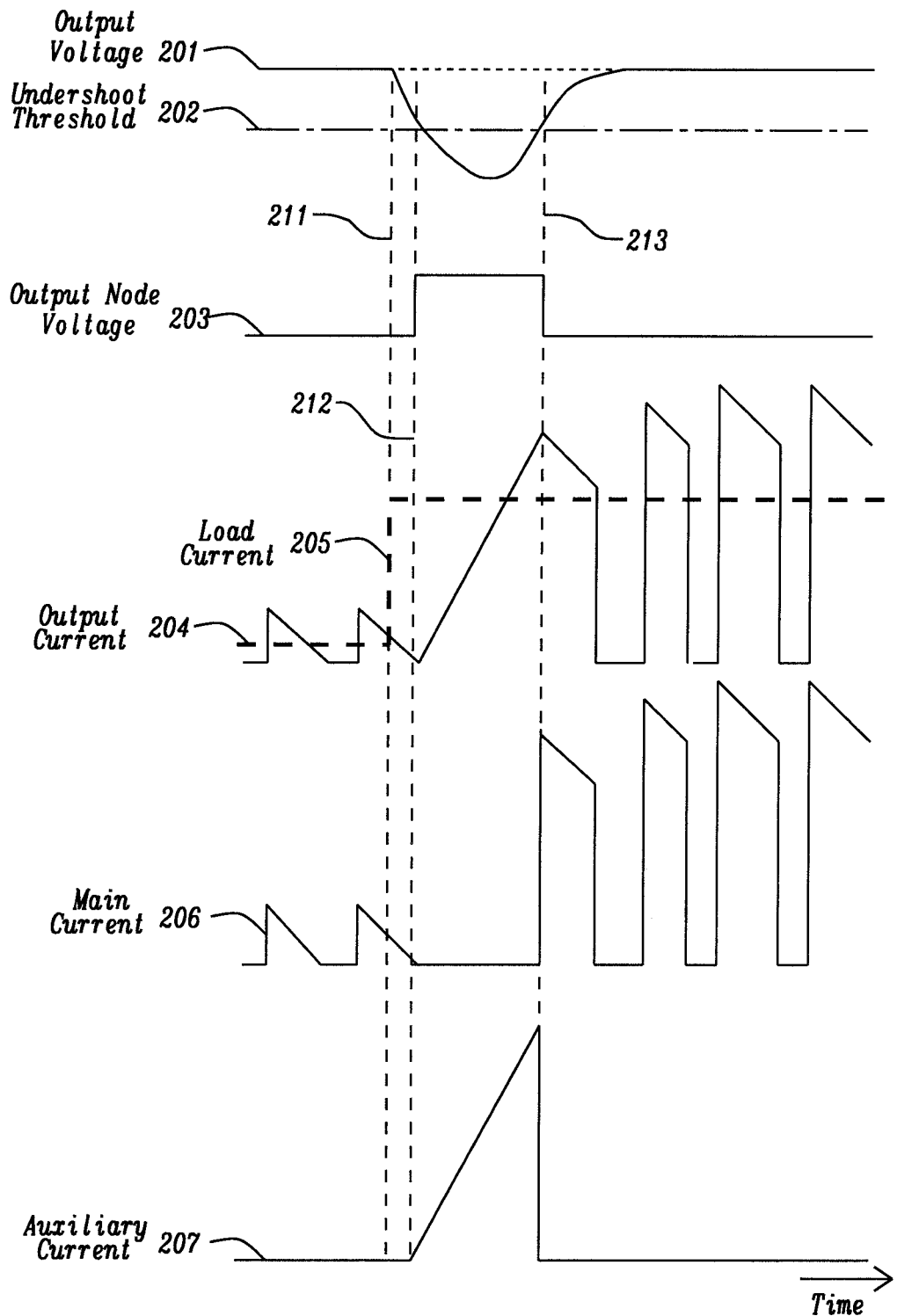
FIG. 2B shows example measurement signals of the switching converter of FIG. 1 when interrupting PWM control.

FIGS. 2A and 2B show timing charts for the power converter 100 of FIG. 1 in case of a load increase. FIG. 2A shows the situation when the main phase 110 is controlled using PWM control. In particular, FIG. 2A shows the output voltage 201 and the main current 206 of the power converter 100 in reaction to an increase of the load current 205 (starting at time instant 211), wherein the main current 206 is the current which is provided by the main phase 110. It can be seen that the main current 206 does not increase sufficiently fast in reaction to the load transient, thereby causing the output voltage 201 to fall below the undershoot threshold 202, and thereby causing the auxiliary phase 120 to be activated (at time instant 212).

The auxiliary phase 120 is operated such that an auxiliary current 207 is provided only within the time intervals during which the high side switch 111 of the main phase 110 is turned off FIG. 2A shows the resulting output current 204 which corresponds to the sum of the main current 206 and the auxiliary current 207. It can be seen that the provision of an additional auxiliary current 207 leads to a reduced duration of the voltage undershoot situation, which ends at time instant 213 and which causes the auxiliary phase 120 to be deactivated.

FIG. 2B shows a mode of operation of the power converter 100 for which the PWM control of the main phase 110 is interrupted, as long that the auxiliary phase 120 is activated. As a result of this, the copied inductor current, which is continuously ramped up, is provided as auxiliary current 207 to the output node 103, thereby further reducing the duration of the voltage undershoot situation.

The auxiliary phase 120 may be operated to provide an auxiliary current 207 also during boost off-time (when the high side switch 111 is turned on). By doing this, the output current 204 of the power converter 100 may be $(2-d)*\alpha I_L$ (with $I_L$ being the inductor current), when the auxiliary phase 120 is enabled (wherein d is the boost on-time divided by the switching period and a is a scaling parameter set by the current source 121, 122 of the auxiliary phase 120).

Figure 3:
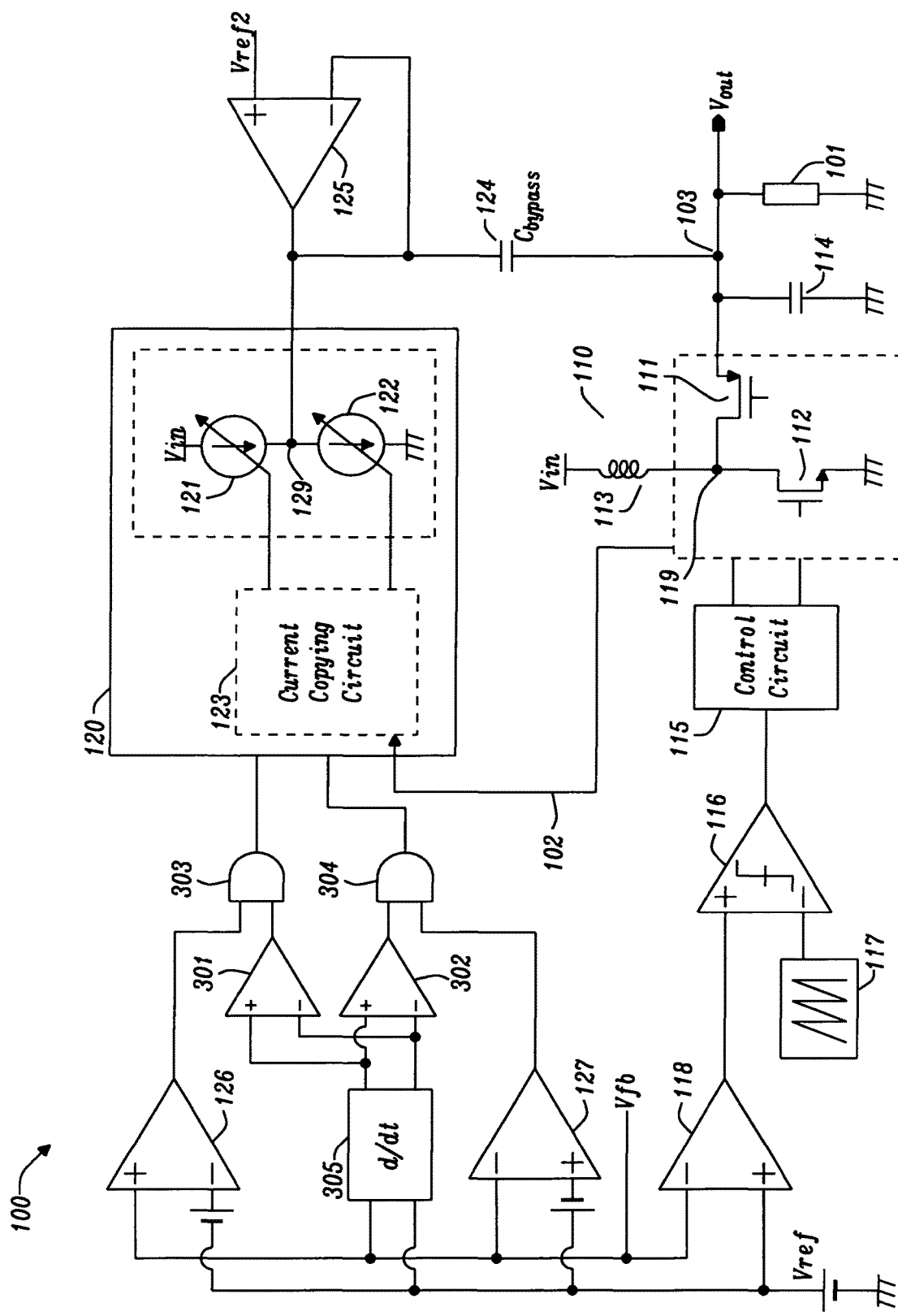
FIG. 3 shows an example switching converter with an auxiliary phase that is activated and/or deactivated in dependence of the slope of the output voltage.

FIG. 3 shows a power converter 100 which comprises a slope detection circuit 305 configured to determine the slope of the output voltage Vout 201. Using the comparators 301, 302, it may be determined whether the slope of the output voltage Vout 201 turns from negative to positive (in case of a voltage undershoot situation), or whether the slope of the output voltage Vout 201 turns from positive to negative (in case of a voltage overshoot situation). Using the logic gates 303, 304, the auxiliary phase 120 may be deactivated, as soon as the slope of the output voltage Vout 201 turns from negative to positive (in case of a voltage undershoot situation) and/or as soon as the slope of the output voltage Vout 201 turns from positive to negative (in case of a voltage overshoot situation). As a result of this, a possible overreaction of the auxiliary phase 120 may be avoided, thereby further improving the load transient response performance of the power converter 100.

Figure 4A:
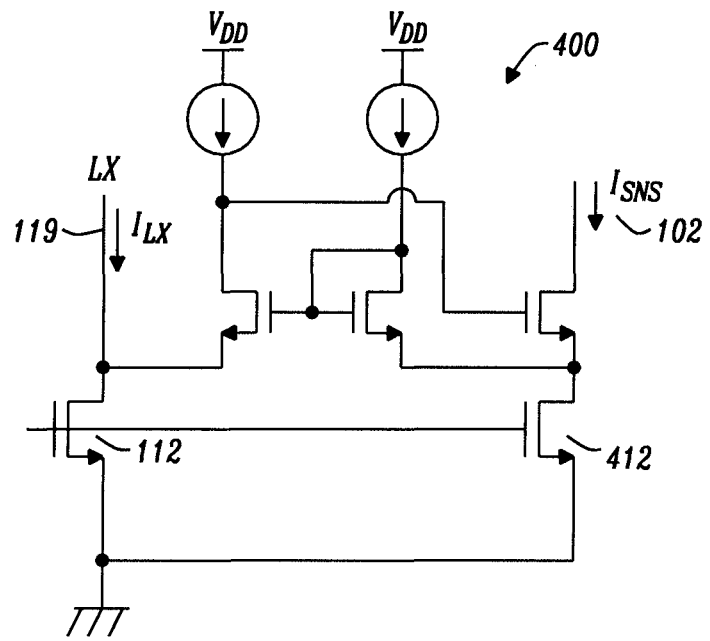
FIGS. 4A and 4B show example current sensing circuits.
Figure 4B:
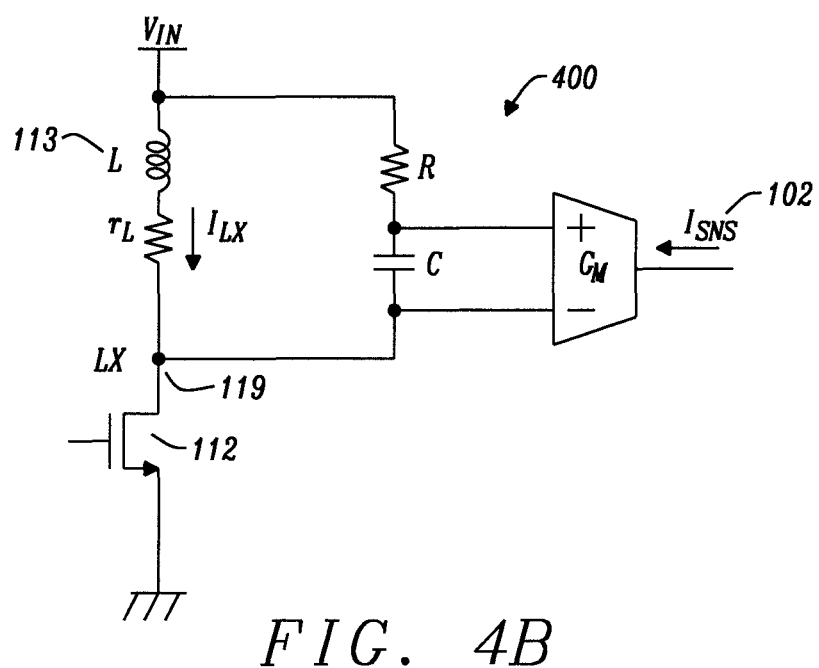

FIGS. 4A and 4B illustrate example current sensing circuits 400. The current sensing circuit 400 of FIG. 4A comprises a sensing transistor 412 which is controlled using the same control signal as the low side switch 112, and which comprises a current mirror configured to mirror the inductor current at the intermediate node 119 to the sensing transistor 412, thereby providing the sensed current 102. A similar current sensing circuit 400 may be provided for the high side switch 111. The current sensing circuit 400 of FIG. 4B comprises circuitry configured to emulate the inductor current.

Figure 5A:
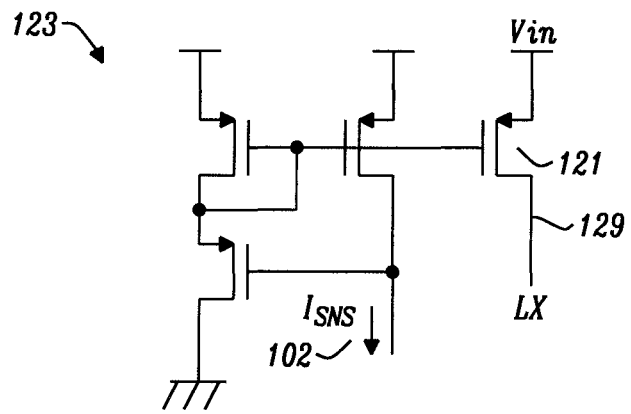
FIGS. 5A and 5B show example current copying circuits.
Figure 5B:
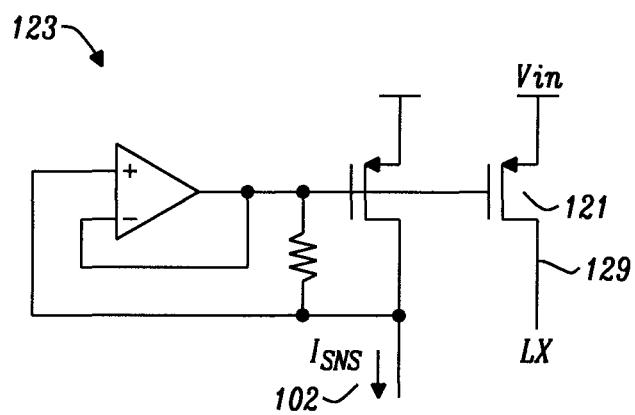

FIGS. 5A and 5B show example current copying circuits 123 which are configured to provide the auxiliary current 207 at the auxiliary output node 129 by copying the sensed current 102. The circuits 123 shown in FIGS. 5A and 5B illustrate the provision of a positive auxiliary current 207 using the high side current source 121. FIG. 5A shows a Wilson current mirror, and FIG. 5B shows a current mirror driven by a voltage follower. Similar circuits may be provided for the low side current source 122.

Hence, there may be different options for copying the main phase current. In particular, the main phase current may be sensed and mirrored to the auxiliary phase 120 using a current mirror (as shown in FIG. 4A). Alternatively, the inductor current may be emulated by a resistance R and a capacitance C connected in series and may be mirrored to the auxiliary phase 120 by a current mirror (as shown in FIG. 4B).

The buffer 125 which regulates the auxiliary phase output voltage is typically only operated in the steady state (when the auxiliary phase 120 is deactivated). As a result of this, the buffer 125 may be implemented in an efficient manner.

Figure 6A:
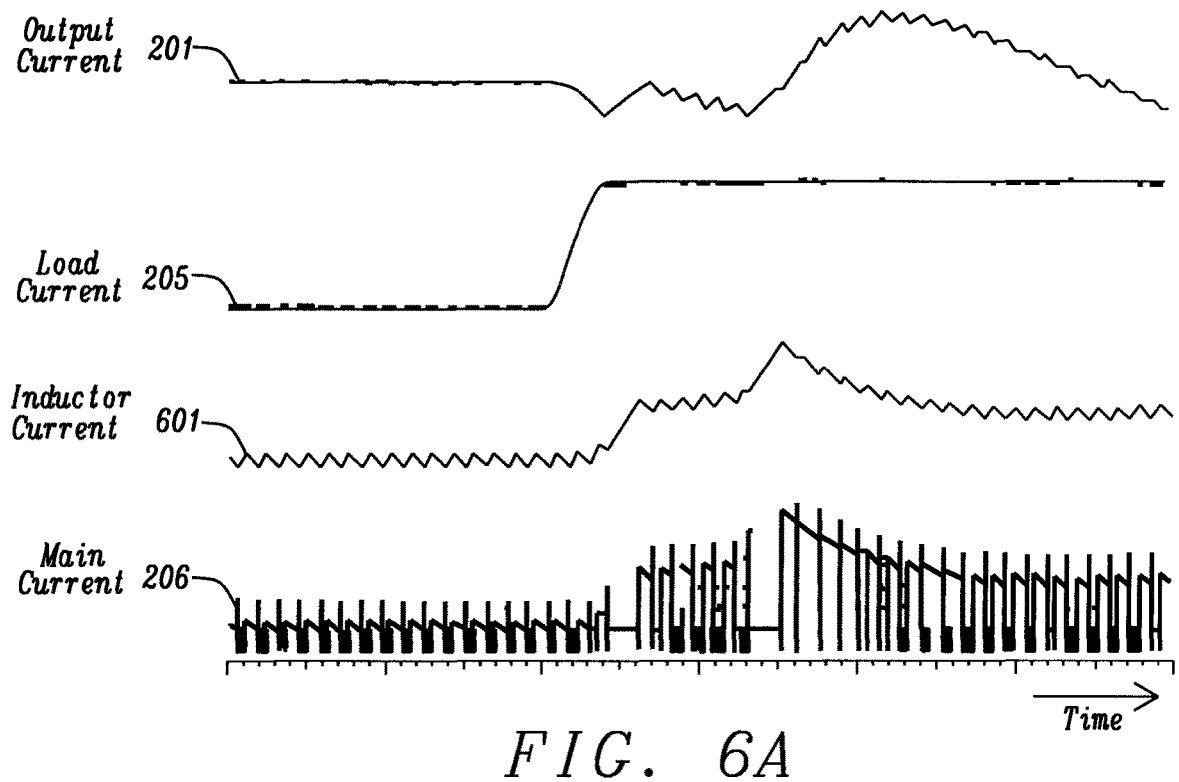
FIG. 6A shows measurements signals for a prior-art step-up converter.
Figure 6B:
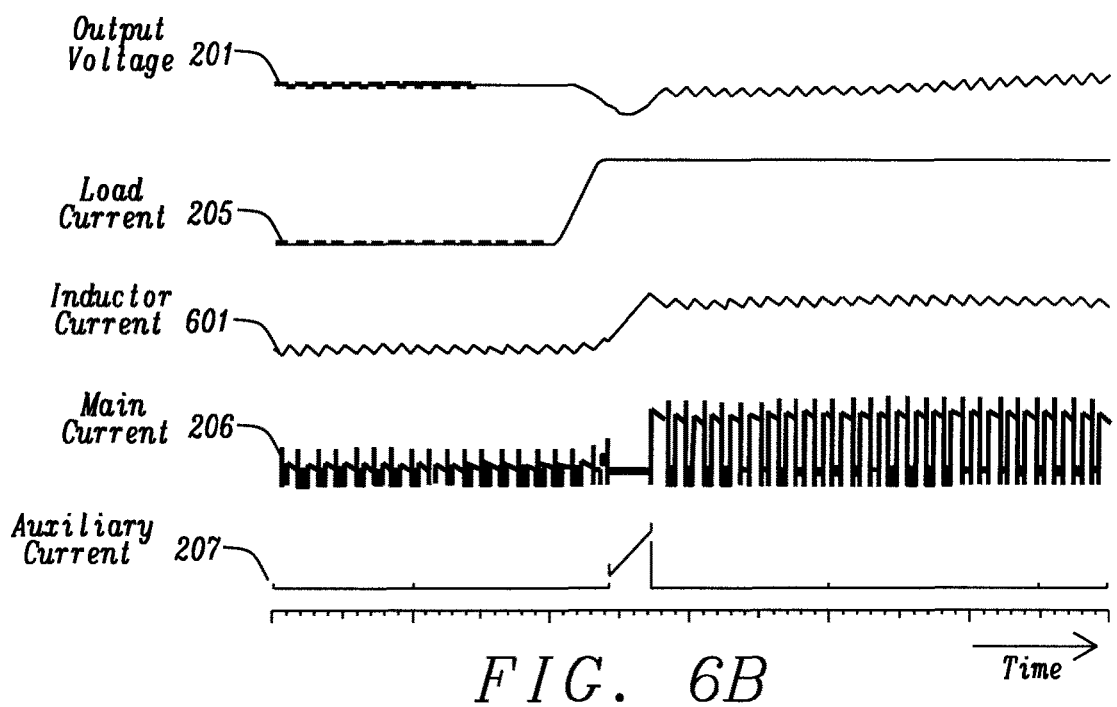
FIG. 6B shows measurement signals for a step-up converter comprising an auxiliary phase.

FIGS. 6A and 6B show example simulation results of a prior art power converter 100 (FIG. 6A) and of a power converter 100 comprising an auxiliary phase 120 as described herein (FIG. 6B), subject to an increase of the load current 205. It can be seen that the output voltage 201 can be stabilized relatively fast using the auxiliary phase 120 described in the present document. FIGS. 6A and 6B also illustrate the inductor current 601 subject to the increase of the load current 205. It can be seen that the level of the inductor current 601 can be adapted to the increased level within a relatively short time interval, when using the auxiliary phase 120.

Figure 7:
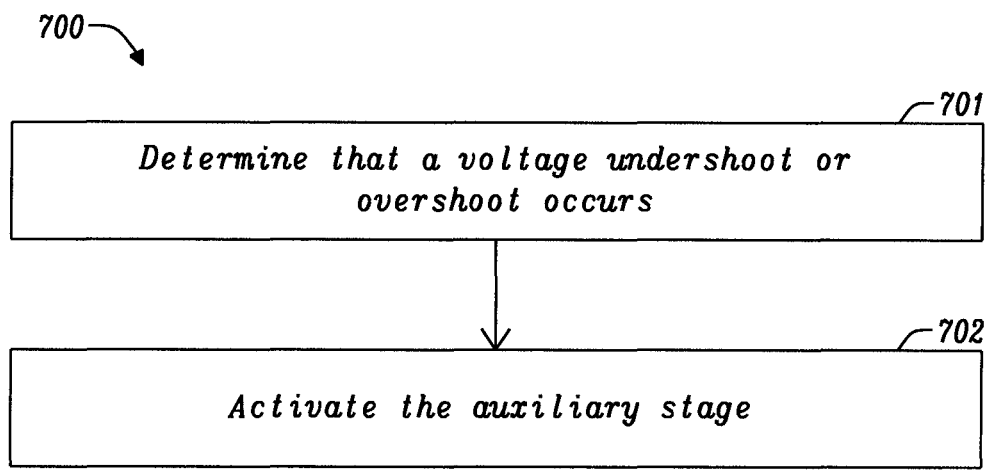
FIG. 7 shows a flow chart of an example method for operating a switching converter in response to a load transient.

FIG. 7 shows a flow chart of an example method 700 for operating a switched (DC-DC) power converter 100. The switched power converter 100 comprises a main stage 110 (also referred to herein as a main phase). The main stage 110 comprises a main converter which exhibits an inductor 113 and at least one switch 111, 112 configured to control an inductor current 601 through the inductor 113. The main converter may be a step-up or boost converter. The one or more switches 111, 112 of the main converter may be or may comprise MOS (metal oxide semiconductor) transistors.

The inductor current 601 is typically drawn from the input node of the switched power converter 100, wherein the input node may be at an input voltage Vin. The main stage 110 may be configured to operate the main converter to provide a main current 206 at an output node 103 of the switched power converter 100 based on the inductor current 601. In particular, the main stage 110 may be configured to control the main converter to provide the inductor current 601 (as main current 206) to the output node 103 at a fraction of the duration of the switching periods of the main converter.

Furthermore, the main stage 110 may be configured to set (notably to regulate) the output voltage 201 at the output node 103 in dependence of a main reference voltage Vref. For this purpose, a regulation loop (as shown in FIG. 1 or 3) may be provided.

The switched power converter 100 further comprises an auxiliary stage 120 (also referred to herein as an auxiliary phase) which is configured to determine a sensed current 102 that is indicative of the inductor current 601. In particular, the sensed current 102 may be proportional to or equal to the inductor current 601. The auxiliary stage 120 may be further configured to provide or sink an auxiliary current 207 to or from the output node 103, wherein the auxiliary current 207 depends on the sensed current 102. In particular, the auxiliary current 207 may be proportional to or equal to the sensed current 102, and/or to the inductor current 601.

The method 700 comprises determining 701 whether the output voltage 201 falls below an undershoot threshold or exceeds an overshoot threshold. This may be achieved using one or more comparators 126, 127. Furthermore, the method 700 may comprise activating 702 the auxiliary stage 120 to provide or sink the auxiliary current 207, (notably only) if it is determined that the output voltage 201 falls below the undershoot threshold or exceeds the overshoot threshold. By doing this, the load response of the switched power converter 100 may be improved.

Hence, a switched power converter 100 comprising a main stage 110 is described. The main stage 110 comprises a main converter that exhibits an inductor 113 and at least one switch 111, 112 configured to control the inductor current 601 through the inductor 113, wherein the inductor current 601 is drawn from the input node of the switched power converter 100. The main converter may comprise or may be a step-up converter. The inductor 113 may be directly coupled to the input voltage Vin and/or to the input node of the switched power converter 100. The main converter may comprise a low side switch 112 configured to couple the inductor 113 with a reference potential (notably ground) of the switched power converter 100. Furthermore, the main converter may comprise a high side switch 111 configured to couple the inductor 113 with the output node 103 of the switched power converter 100.

The main stage 110 may be configured to operate the main converter to provide a main current 206 at the output node 103 of the switched power converter 100 based on the inductor current 601. In particular, the main converter may be operated to repeatedly couple the inductor 113 to the output node 103 (during the repeated switching periods), in order to repeatedly provide the inductor current 601 as main current 206 to the output node 203.

Furthermore, the main stage 110 is configured to set (notably to regulate) the output voltage 201 at the output node 103 in dependence of (or to) a main reference voltage Vref. For this purpose, the main stage 110 may comprise a regulation loop as shown e.g. in FIGS. 1 and 3.

In addition, the switched power converter 100 comprises an auxiliary stage 120 which is configured to determine a sensed current 102 that is indicative of the inductor current 601. For this purpose, the auxiliary stage 120 may comprise a current sensing circuit 400 (e.g. as shown in FIG. 4A or in FIG. 4B) configured to sense the inductor current 601 and to provide the sensed current 102 which is indicative of the inductor current 601.

Furthermore, the auxiliary stage 120 is configured to provide or sink an auxiliary current 207 to or from the output node 103, wherein the auxiliary current 207 depends on the sensed current 102. In particular, the auxiliary stage 120 may comprise a current copying circuit 123 which is configured to copy the sensed current 102 (and/or the inductor current 601) to provide the auxiliary current 207. Hence, the auxiliary stage 120 may be configured to provide an auxiliary current 207 to the output node 103 of the switched power converter 100, wherein the auxiliary current 207 is a scaled copy of the inductor current 601.

As a result of this, the overall output current 204 at the output node 103 of the switched power converter 100 may be equal to or dependent on the sum of the main current 206 and the auxiliary current 207.

In addition, the switched power converter 100 comprises control circuitry 126, 127 which is configured to determine whether the output voltage 201 falls below an undershoot threshold or exceeds an overshoot threshold. In other words, it may be determined whether a voltage undershoot or a voltage overshoot occurs at the output node 103 of the switched power converter 100. Such a voltage undershoot or a voltage overshoot may be due to a load transient. Detecting a voltage undershoot or a voltage overshoot may be achieved using a comparator 126, 127 (as shown in FIG. 1 or FIG. 3).

Furthermore, the control circuitry 126, 127 is configured to activate the auxiliary stage 120 to provide or sink the auxiliary current 207, (possibly only) if it is determined that the output voltage 201 falls below the undershoot threshold or exceeds the overshoot threshold. In particular, the auxiliary stage 120 may be operated selectively only during a voltage undershoot or a voltage overshoot. By activating the auxiliary stage 120 to provide the auxiliary current 207 (e.g. being a (scaled) copy of the inductor current 601), the speed for terminating the voltage undershoot or the voltage overshoot may be increased, thereby increasing the load transient performance of the switched power converter 100.

The auxiliary stage 120 may comprise a current source 121, 122 which is configured to provide or sink the auxiliary current 207. The current source 121, 122 may be controlled in dependence of the sensed current 102.

In particular, the auxiliary stage 120 may comprise a high side current source 121 (e.g. comprising a (MOS) transistor) which is configured to draw the auxiliary current 207 from the input voltage Vin at the input node of the switched power converter 100. The auxiliary stage 120 may be configured to control the high side current source 121 to draw the auxiliary current 207 from the input voltage Vin at the input node of the switched power converter 100, (possibly only) if it is determined that the output voltage 201 falls below the undershoot threshold.

Alternatively, or in addition, the auxiliary stage 120 may comprise a low side current source 122 (e.g. comprising a transistor) which is configured to sink the auxiliary current 207 to the reference potential of the switched power converter 100 (e.g. to ground). Furthermore, the auxiliary stage 120 may be configured to control the low side current source 122 to sink the auxiliary current 207 to the reference potential of the switched power converter 100, if it is determined that the output voltage 201 exceeds the overshoot threshold.

By making use of one or more current sources 121, 122 for providing or sinking the auxiliary current 207, a stable operation of the auxiliary stage 120 may be achieved.

The auxiliary stage 120 may comprise a bypass capacitor 124 for coupling an auxiliary output node 129 of the auxiliary stage 120 to the output node 103 of the switched power converter 100. The bypass capacitor 124 may be arranged (directly) between the auxiliary output node 129 and the output node 103 of the switched power converter 100. The auxiliary current 207 may be provided to the output node 103 of the switched power converter 100 via the bypass capacitor 124. The use of the bypass capacitor 124 allows the auxiliary stage 120 to be decoupled from the output node 103 of the power converter 100 during steady state operation (when the auxiliary stage 120 is deactivated).

The auxiliary stage 120 may comprise a buffer 125 (which may comprise an operational amplifier with the output being fed back to one input of the operation amplifier) which may be configured to set an auxiliary voltage at the auxiliary output node 129 of the auxiliary stage 120 to an auxiliary reference voltage Vref2. The auxiliary reference voltage Vref2 may depend on the input voltage Vin at the input node of the switched power converter 100. In particular, the auxiliary reference voltage Vref2 may take on a value which is between the reference potential (e.g. ground) and the input voltage Vin.

By way of example, the auxiliary reference voltage Vref2 may be Vin/2. The buffer 125 may be used to set and/or to regulate the auxiliary voltage at the auxiliary output node 129 of the auxiliary stage 120 during steady state operation of the switched power converter 100 (when the auxiliary stage 120 is deactivated). By doing this, the auxiliary stage 120 is preconditioned to enable a fast and reliable provision of the auxiliary current 207 in case of a voltage undershoot or a voltage overshoot.

The control circuitry 126, 127 may be configured to determine the slope of the output voltage 102. The auxiliary stage 120 may be activated and/or deactivated in dependence of the slope of the output voltage 102. In particular, the control circuitry 126, 127 may be configured to deactivate the auxiliary stage 120 if, subsequent to an undershoot of the output voltage 102, the slope of the output voltage 102 changes from negative to positive. Alternatively, or in addition, the control circuitry 126, 127 may be configured to deactivate the auxiliary stage 120 if, subsequent to an overshoot of the output voltage 102, the slope of the output voltage 102 changes from positive to negative. By taking into account the slope of the output voltage 102, the load transient response of the switched power converter 100 may be improved further.

The main converter may be operated and/or designed such that a switching period of the at least one switch 111, 112 (notably of the low side switch 112) of the main converter comprises a time interval during which the main current 206 which is provided at the output node 103 is zero. This may be the case for each period of a sequence of periods. The auxiliary stage 120 may be configured to provide the auxiliary current 207 to the output node 103 (notably exclusively) within the time interval during which the main current 206 which is provided at the output node 103 is zero. By doing this, a stable recovery from a voltage undershoot or a voltage overshoot may be achieved.

The main stage 110 may be configured to operate the main converter using a pulse width modulation (PWM) control or using a pulse frequency modulation (PFM) control. The main stage 110 may be configured to interrupt the PWM control or the PFM control, while the auxiliary stage 120 is activated, such that the main converter does not provide a main current 206 to the output node 103 of the switched power converter 100, when the auxiliary stage 120 is activated (notably for the complete time or for a fraction of the time that the auxiliary stage 120 is activated).

The main stage 110 may be configured to interrupt the PWM control or the PFM control such that the inductor current 601 continues to ramp up, while the auxiliary stage 120 is activated. Furthermore, the auxiliary stage 120 may be configured to provide or to sink an auxiliary current 207 which continues to ramp up in accordance to the inductor current 601, while the auxiliary stage 120 is activated.

By interrupting the PWM control or the PFM control of the main converter, when the auxiliary stage 120 is activated, the speed of recovery from a voltage undershoot or a voltage overshoot may be improved.

Alternatively, or in addition, the main stage 110 may be configured to continue the PWM control or the PFM control of the main converter, at least during a fraction of the time or for the complete time that the auxiliary stage 120 is activated, such that the main converter provides a main current 206 to the output node 103 of the switched power converter 100 at least during a fraction of a duration of the switching periods of the main converter. By continuing the PWM control or the PFM control of the main converter, when the auxiliary stage 120 is activated, a stable recovery from a voltage undershoot or a voltage overshoot may be achieved.

In the present document, an efficient and stable power converter 100 is described which exhibits a fast load transient response. The power converter 100 only requires a relatively small area overhead for the auxiliary stage 120. The auxiliary stage 120 which is described in the present document may be used for step-up and step-down converters, but is particularly beneficial in conjunction with step-up converters. Due to the fact that the auxiliary phase 120 works as a current source or as a current sink (and not as a switch), the auxiliary phase 120 exhibits a relative low risk with regards to kick-backs and feed-throughs.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A switched power converter comprising,
   a main stage with a main converter which exhibits an inductor and at least one switch configured to control an inductor current through the inductor; wherein the inductor current is drawn from an input node of the switched power converter; wherein the main stage is configured to operate the main converter to provide a main current at an output node of the switched power converter based on the inductor current; wherein the main stage is configured to set an output voltage at the output node in dependence of a main reference voltage;
   an auxiliary stage configured to
      determine a sensed current indicative of the inductor current; and
      provide or sink an auxiliary current to or from the output node; wherein the auxiliary current depends on the sensed current; and
   control circuitry configured to
      determine whether the output voltage falls below an undershoot threshold or exceeds an overshoot threshold; and
      activate the auxiliary stage to provide or sink the auxiliary current, if it is determined that the output voltage falls below the undershoot threshold or exceeds the overshoot threshold,
   wherein the main stage is configured to operate the main converter using a pulse width modulation, referred to as PWM, control or using a pulse frequency modulation, referred to as PFM, control;
   wherein the main stage is configured to interrupt the PWM control or the PFM control, while the auxiliary stage is activated, such that the main converter does not provide the main current to the output node of the switched power converter when the auxiliary stage is activated;
   where the main stage is configured to interrupt the PWM control or the PFM control such that the inductor current continues to ramp up, while the auxiliary stage is activated; and
   wherein the auxiliary stage is configured to provide or to sink an auxiliary current which continues to ramp up in accordance to the inductor current, while the auxiliary stage is activated.

2. The switched power converter of claim 1, wherein the auxiliary stage is configured to provide or sink the auxiliary current which is a scaled copy of the sensed current and/or of the inductor current.

3. The switched power converter of claim 1, wherein
   the auxiliary stage comprises a current source configured to provide or sink the auxiliary current; and
   the current source is controlled in dependence of the sensed current.

4. The switched power converter of claim 1, wherein
the auxiliary stage comprises a bypass capacitor for coupling an auxiliary output node of the auxiliary stage to the output node of the switched power converter; and
the auxiliary current is provided to the output node of the switched power converter via the bypass capacitor.

5. The switched power converter of claim 1, wherein
the auxiliary stage comprises a buffer configured to set an auxiliary voltage at an auxiliary output node of the auxiliary stage to an auxiliary reference voltage; and
the auxiliary reference voltage depends on an input voltage at the input node of the switched power converter.

6. The switched power converter of claim 1, wherein
the auxiliary stage comprises a high side current source configured to draw the auxiliary current from an input voltage at the input node of the switched power converter; and/or
the auxiliary stage comprises a low side current source configured to sink the auxiliary current to a reference potential of the switched power converter.

7. The switched power converter of 6, wherein the auxiliary stage is configured to
control the high side current source to draw the auxiliary current from the input voltage at the input node of the switched power converter, if it is determined that the output voltage falls below the undershoot threshold; and/or
control the low side current source to sink the auxiliary current to the reference potential of the switched power converter, if it is determined that the output voltage exceeds the overshoot threshold.

8. The switched power converter of claim 1, wherein the control circuitry is configured to
determine a slope of the output voltage; and
activate and/or deactivate the auxiliary stage in dependence of the slope of the output voltage.

9. The switched power converter of claim 8, wherein the control circuitry is configured to
deactivate the auxiliary stage if, subsequent to an undershoot of the output voltage, the slope of the output voltage changes from negative to positive; and/or
deactivate the auxiliary stage if, subsequent to an overshoot of the output voltage, the slope of the output voltage changes from positive to negative.

10. The switched power converter of claim 1, wherein
the auxiliary stage comprises a current sensing circuit configured to sense the inductor current in order to provide the sensed current; and
the auxiliary stage comprises a current copying circuit configured to copy the sensed current to provide the auxiliary current.

11. The switched power converter of claim 1, wherein
the main converter is such that a switching period of the at least one switch of the main converter comprises a time interval during which the main current which is provided at the output node is zero; and
the auxiliary stage is configured to provide the auxiliary current to the output node within the time interval during which the main current which is provided at the output node is zero.

12. The switched power converter of claim 1, wherein
the main stage is configured to continue the PWM control or the PFM control of the main converter, while the auxiliary stage is activated, such that the main converter provides the main current to the output node of the switched power converter at least during a fraction of a duration of switching periods of the main converter.

13. The switched power converter of claim 1, wherein
the main converter comprises a step-up converter; and/or
the inductor is directly coupled to an input voltage and/or to the input node of the switched power converter; and/or
the main converter comprises a low side switch configured to couple the inductor with a reference potential of the switched power converter; and/or
the main converter comprises a high side switch configured to couple the inductor with the output node of the switched power converter.

14. A method for operating a switched power converter; wherein
the switched power converter comprises a main stage with a main converter which exhibits an inductor and at least one switch to control an inductor current through the inductor; wherein the inductor current is drawn from an input node of the switched power converter; wherein the main stage operates the main converter to provide a main current at an output node of the switched power converter based on the inductor current; wherein the main stage sets an output voltage at the output node in dependence of a main reference voltage;
the switched power converter comprises an auxiliary stage
to determine a sensed current indicative of the inductor current; and
to provide or sink an auxiliary current to or from the output node; wherein the auxiliary current depends on the sensed current; and
the method comprises,
determining whether the output voltage falls below an undershoot threshold or exceeds an overshoot threshold; and
activating the auxiliary stage to provide or sink the auxiliary current, if it is determined that the output voltage falls below the undershoot threshold or exceeds the overshoot threshold,
wherein the main stage is configured to operate the main converter using a pulse width modulation, referred to as PWM, control or using a pulse frequency modulation, referred to as PFM, control;
wherein the main stage is configured to interrupt the PWM control or the PFM control, while the auxiliary stage is activated, such that the main converter does not provide the main current to the output node of the switched power converter when the auxiliary stage is activated;
where the main stage is configured to interrupt the PWM control or the PFM control such that the inductor current continues to ramp up, while the auxiliary stage is activated; and
wherein the auxiliary stage is configured to provide or to sink an auxiliary current which continues to ramp up in accordance to the inductor current, while the auxiliary stage is activated.

* * * * *